United States Patent [19]

Radici et al.

[11] 4,000,217
[45] Dec. 28, 1976

[54] PROCESS FOR THE POLYMERIZATION OF FORMALDEHYDE IN THE PRESENCE OF ANIONICALLY POLYMERIZED LACTAM

[75] Inventors: Pierino Radici, Turate; Daniele Colombo, Castellanza; Paolo Colombo, Saronno, all of Italy

[73] Assignee: Societa' Italiana Resine S.I.R. S.p.A., Milan, Italy

[22] Filed: Dec. 22, 1975

[21] Appl. No.: 642,825

[30] Foreign Application Priority Data

Dec. 20, 1974 Italy .......................... 30818/74

[52] U.S. Cl. .................. 260/857 F; 260/33.2 R; 260/33.6 R; 260/33.8 R; 260/45.85 R; 260/45.95 R

[51] Int. Cl.² .................................. C08L 77/00

[58] Field of Search .......................... 260/857 F

[56] References Cited

UNITED STATES PATENTS

| | | | |
|---|---|---|---|
| 2,993,025 | 7/1961 | Alsvp | 260/857 F |
| 3,204,012 | 8/1965 | Eguchi | 260/857 F |
| 3,235,624 | 2/1966 | Green | 260/857 F |
| 3,288,885 | 11/1966 | Green | 260/857 F |

Primary Examiner—Paul Lieberman
Attorney, Agent, or Firm—Sughrue, Rothwell, Mion, Zinn & Macpeak

[57] ABSTRACT

Polyoxymethylene is prepared by feeding anhydrous formaldehyde into a reaction medium containing a liquid organic diluent non-solvent for the polyoxymethylene and non-reactive towards the other constituents of the reaction medium, and containing in a dispersed form a polymer A carrying a terminal ionic couple on its macromolecular chain, said polymer A being a polylactamic block of recurring units

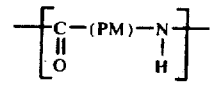

wherein PM is a linear polymethylene chain having from 3 to 13 carbon atoms, and being present in a proportion of from 0.001 to 0.1% by weight with respect to the polyoxymethylene.

9 Claims, No Drawings

PROCESS FOR THE POLYMERIZATION OF FORMALDEHYDE IN THE PRESENCE OF ANIONICALLY POLYMERIZED LACTAM

The present invention concerns the preparation of formaldehyde polymers by means of a new class of compounds capable of catalyzing the polymerization of formaldeyde.

Polymers of formaldehyde (or polyoxymethylenes) havng a molecular weight of at least 10,000 endowed with mechanical characteristics such as toughness, hardness, resilience, exceptional dimensional stability and dielectric properties, such as to make them useful as plastic materials for engineering purposes are known in the art.

These polyoxymethylenes are generally produced by introducing monomeric and anhydrous formaldehyde is a liquid organic reaction medium, carrying out the operation in a large field of temperatures and in the presence of catalysts for the polymerization reaction.

In particular, the known catalysts suitable for this purpose are of various natures such as: amino compounds, for example aliphatic, cycloaliphatic and aromatic amines; or arsines, stibines and phosphines in which the hydrogen atoms respectively bonded to arsenic, antimony and phosphorus are substituted by hydrocarbon organic radicals.

Other catalysts used in the art hydrazines, organic acid salts such as alkali metal acetates, and compounds of the boron halides type (boron trichloride and trifluoride) and aluminum trichloride.

The catalysts described do not produce completely satisfactory results, mainly because they often do not allow an effective control of the molecular weight of the formaldehyde polymer. Consequently the polyoxymethylenes produced may present a great dispersion of the molecular weight with the related drawbacks.

Besides said catalysts must be accurately removed from the polymer at the end of the polymerization and therefore they involve costly purification treatments.

As known a drawback which arises in the preparation of polyoxymethylenes is due to the fact that the formaldehyde easily polymerizes on any surface, especially if the latter is cooled, originating scales which generally lead to an intolerable worsening of the heat exchange coefficients and to the obstruction of pipes and valves, with a need for frequent shutdowns for cleansing.

Up to the present no simple and effective method has been found to avoid such drawback or, at least, to reduce it within tolerable limits.

Besides in the processes wherein the formaldehyde is polymerized in the presence of an organic liquid, suspensions with a high viscosity even at low polymer concentrations are generally obtained, wherefrom the decantation and the filtration of the polymer is rendered difficult.

The drawbacks of the prior art are avoided or at least greatly reduced by the process of the present invention, which essentially consists of polymerizing the formaldehyde by means of a catalyst belonging to a new class.

The invention provides a process for the preparation of polyoxymethylene, characterized by feeding anhydrous monomeric formaldehyde into a reaction medium comprising an organic diluent which is liquid under the reaction conditions, non solvent for the polyoxymethylene and inert (non-reactive) towards the other constitutents of the reaction medium, and comprising a catalyst dispersed in said liquid reaction medium, consisting of a polymer A carrying a terminal ionic couple on its macromolecular chain, said polymer being a polylactamic block consisting of recurring units:

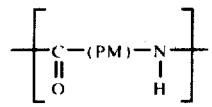

obtainable from one or more lactam monomers of the general formula:

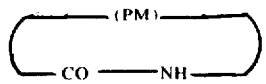

wherein PM is a linear polymethylene chain having from 3 to 13 carbon atoms, non-substituted or having at least one hydrogen atom replaced by an alkyl, aryl, alkylaryl or cycloalkyl radical.

Besides said polymer A has preferably a molecular weight of from 1000 to 50,000 and gives the best results when present in an amount of from 0.001 to 0.1% by weight with respect to the polyoxymethylene.

As is known in the art, the polymerization of lactam monomers in the presence of an anionic catalyst gives rise to a polymer A with a ionic couple on a chain terminal.

Reference is made in this connection to MAKROMOLEKULARE CHEMIE 115 (1968) p.33–42, 127 (1969) p.34–53, 89 (1965) p. 27–43; to FORTSCHRITTE DER HOCHPOLYMEREN-FORSCHUNG 2 (1961) p.578–595; and to IUPAC, 1972 (Helsinki) Preprint 1, p.227–232).

It has been found that this ionic couple originates the formaldehyde polymerization with production of high molecular weight polyoxymethylene, according to a trend typical of the living polymers.

Whatever the reaction mechanism may be, the polymer A acts as a heterogeneous catalyst in the reaction medium, allowing extremely high velocities of reaction, with almost quantitative polymerization yields with respect to the feed in formaldehyde. Besides, the resulting polyoxymethylene has a ratio of the average ponderable molecular weight to the numerical molecular weight lower than 2.

This narrow molecular distributions is due to the nature of the catalyst used in the process of the present invention especially when it is utilized for catalyzing the polymerization of highly pure monomeric formaldehyde.

This physical-molecular feature of the polyoxymethylene, as known, is of fundamental importance for the properties of a technopolymer, mainly as regards the toughness, the resilience, the resistance to abrasion and the dimensional stability of the molded products.

By employing the said catalyst in the process of the present invention, it is possible to obtain an exceptionally high ratio of the polyoxmethylene to the diluent in the reaction medium, said ratio being liable to reach values up to 1:1 by weight.

Besides said polyoxymethylene has a very high apparent density (0.6–0.8 g/ml), is easily separable by decantation and filtration from the reaction mass, and the filtered polymer shows a very low content in residual solvent.

Besides an advantageous characteristic of the process of the invention is the absence of scales of formaldehyde polymer on the walls and on the stirring means in the polymerization vessel.

The catalyst does not require to be separated from the polyoxymethylene and remains linked in a stable manner to the polyoxymethylene macromolecular chain.

On the contrary the presence of the polymer A in the polyoxymethylene affords further advantages and desirable effects on the properties of the polyoxymethylenes.

In fact, as known, polyoxymethylene is a polymer with a high degree of crystallinity and its properties are strictly connected to its crystalline morphology. The polymer A in the marcomolecular chain constitutes a means of influencing this morphology is so far as a desired crystallization speed can be obtained with the polymer A acting as a crystallization nucleus.

PREPARATION OF THE CATALYST

(Polymer A)

The catalyst used in the process of the present invention is prepared by catalytic polymerization of one or more lactam monomers, chosen among those previously defined.

The preferred lactams are: ε-caprolactam, α-pyrrolidone, ω-lauryllactam, α-piperidone and ω-enantiolactam. The polymerization occurs in the presence of an anionic catalyst constituted of a lactam derivative.

In particular said catalyst is constituted of a lactam derivative with the following structure:

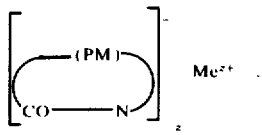

wherein Me represents an alkali or alkaline earth metal, or a quaternary ammonium group, z is equal to 1 to 2 and PM is the previously defined polymethylene chain.

Among the alkali metals, lithium, sodium and potassium are preferred, while among the alkaline-earth metals, calcium is preferred. In the case of the ammonium group the hydrogen atoms are substituted by alkyl-, cycloalkyl-, aryl- or alkyl-aryl groups.

The catalyst may be pre-formed before being added to the polymerization medium or it may be prepared "in situ" by reaction between the lactam and Me or a derivative of the latter.

For practical reasons it is preferred to introduce in the reactive medium containing the lactam the alkali- or alkaline-earth metal or an organo-metallic derivative thereof or its hydrides, alkoxide, phenoxide or its hydroxide and to form the derivative of the lactam in said medium.

Preferably the anionic preparation of the polymer A may be performed also, in the presence of an activator in addition to the mentioned catalyst. The presence of these substances, called also co-catalyst or promoters, makes it possible to maintain milder polymerization conditions, with reduction or elimination of secondary reactions, to decrease the initial induction time and to obtain polymers with a more controlled molecular weight.

Examples of these substances are the acyl-lactams such as the acetyls-, the organic chlorides, the N-substituted imides or the esters of organic acids such as etyl acetate, the isocyanates such as phenyl isocyanate etc.

For the preparation of polymer A the operation is preferably carried out in an anhydrous atmosphere and in absence of oxygen, and at a temperature which may vary within a large range, generally from -30° to 300° C. The best suited temperature should be selected within the range of values hereinbefore defined according to each individual case.

Accordingly the polymerization time vary from 1 minute to 120 hours.

In any event an amount of catalyst (lactam derivative) ranging from 0.1 to 10 moles for each 100 moles of the monomer charge and, preferably, an amount of activator varying from 0.015 to 10 moles for each 100 moles of monomer is used.

Finally the lactam polymerization may be preformed in suspension, in solution or in absence of solvents or diluents.

The polymer A thus obtained is separated from the reaction medium and can be used as such for the preparation of the polyoxymethylene.

However in the preferred embodiment, the raw polymer A is submitted to treatments capable of:

—separating in a particularly pure form the polymer a containing the catalytically active centers in its macromolecular chain;

—setting the polymer A in a particulate form suitable for the subsequent formaldehyde polymerization.

In particular the polymer A obtained according to the techniques previously described is purified for the purpose of separating the unreacted monomer or monomers, the free catalytic residues and other eventual impurities.

The purification is generally performed by dissolution of the polymer A in a solvent followed then by precipitation and washing of the polymer A.

Solvents suitable for this treatment are those in which the impurities are highly soluble and which do not destroy the catalytically active centers bonded to the macromolecular chain.

In particular the solvents belong to the following general classes: chlorinated aliphatic hydrocarbons, chlorinated aromatic hydrocarbons, aromatic nitroderivatives, substituted amides, sulfoxides and alkyl-, aryl- or cycloaryl phosphoramides.

Examples of such solvents are: nitrobenzene, chlorobenzene, dimethylformamide, dimethyl sulfoxide and hexamethylphosphoric triamide.

According to an embodiment, the raw polymer A is dissolved in the solvent at a temperature ranging from 20° to 200° C. Then precipitation of polymer A is induced by cooling of the solution and/or by addition of a non-solvent for the polymer.

Non-solvent particularly suitable for this purpose are the aliphatic or aromatic hydrocarbons, such as, for example, hexane, heptane, octane, benzene, toluene, xylene and others.

Then the polymer A is filtered and washed by means of the above described solvent, until the filtrate is free from impurities. These last operations may be performed at room temperature of even at a higher temperature. The polymer A thus obtained is utilized as catalyst in the form of a suspension in a diluent and therefore it is advantageous to bring said polymer to a finely subdivided particulate form for the purpose of facilitating the contact of its active centers with the formaldehyde.

For this reason, at the stage of the above-discussed purification treatment where the polymer A forms a precipitate, the conditions are generally so adjusted that the size of the particles of the precipitate from 1 to 300 microns, and preferably from 1 to 100 microns.

The treatment under discussion may offer some particular aspects according as the polymer A originates from a polymerization in solution, in suspension or in the absence of diluents or solvents.

Thus, for instance, in the case of a bulk polymerization or a polymerization in the molten state, the polymer A is conveniently pulverized and dissolved in a suitable solvent, or it is directly dissolved in the molten state. Then the precipitation and the washing of the polymer A are carried out. Said dissolution and precipitation operations may be repeated several times.

The polymer A obtained by the suspension polymerization is usually in a physical form suitable for the subsequent polymerization of formaldehyde. Sometimes it can be sufficient to filter the suspension and wash thoroughly the solid to separate the undersirable impurities.

The polymer A obtained by the solution polymerization is usually precipitated by cooling and/or by addition of a non-solvent for the polymer. Filtration and washing then follow.

It will be obvious from the above discussion that it is preferable by means of the solution or the suspension technique, because the impurities remain solubilized at least in part in the diluent or in the solvent.

In this case, this dispenses the from dissolving the polymer A in the aforesaid solvent in which the impurities are soluble and even from precipitating it, in the case of a suspension polymerization.

In this case also, it is absolutely preferable to polymerize by the suspension technique, because the polymer A is then obtained in the form of finely subdivided particles (granulometry ranging from 1 to 300 microns) suitable for the polymerization of the formaldehyde.

PREPARATION OF THE POLYOXYMETHYLENE

As previously stated, the polyoxymethylene is prepared by feeding gaseous and anhydrous formaldehyde in a reaction medium containing an organic diluent, which is liquid under the operation conditions, non-solvent for the polyoxymethylene and inert (non reactive) with respect to the other constituents of the reaction medium, said medium containing the catalyst in a dispersed form.

The diluents suitable for the purpose are of various natures, such as, for example, ethers (diethyl ether and dimethyl ether), hydrocarbons (pentane, hexane, heptane, decane, cyclohexane, decahydronaphthalene,, xylene, benzene and toluene) and chlorinated hydrocarbons (methylene chloride).

Preferred diluents are hydrocarbons, particularly those with 5-10 carbon atoms per molecule.

In any event said diluents must not interfere with the active centers of polymer A and must be inert (non-reactive) with respect to the other constituents of the reaction medium.

The formaldehyde used should be endowed with high characteristics of purity and dryness and that in order to obtain polymers of high molecular weight (at least 10,000). Such a formaldehyde can be obtained, for instance, by the purification methods described in the U.S. Pat. Nos. 3,118,747 and 3,184,900.

In particular, as impurities, are intended those chemical compounds giving rise to chain transfer reactions and consisting of compounds of polar character which normally react with the organometallic compounds of Grignard. In particular, the most common impurities consists of methanol, water and formic acid. These substances acts as chain transfer agents during polymerization and therefore the polyoxymethylene molecular structure depends on their contents.

The adjustment of the molecular weight is generally assigned to a single chain regulator added for this purpose. In this case it is evidently possible to use a compound of various nature such as, for example: a carboxylic acid, an ester with at least three carbon atoms, an aliphatic alcohol with at least two carbon atoms, a cycloaliphatic or aromatic alcohol, and anhydride of a carboxylic acid, an amide, an imine and others.

A polyoxymethylene whose molecular weight is controlled in such a manner as to permit the obtaining of polymer products which, after convenient stabilization are suitable for spinning or for processing by injection molding, by extrusion or by the processes known as "roto-molding" and "blow-molding" with production of molded articles and parts useful in the practice, is obtained by using purified formal dehyde and the previously defined catalyst.

The polymerization temperature may vary within large limits, that is from about −70° C up to the boiling temperature of the organic diluent used, at any rate not exceeding 110° C, while the pressure is usually maintained at atmospheric value, even if it is possible to carry out the operation at values above or below the atmospheric pressure.

The best results are obtained by carrying out the operation within an interval of temperature ranging from −30° C to 70° C.

The formaldehyde polymerization may be performed in a discontinuous-, a semi-continous- or a continuous way. When the operation is carried out in a continuous way the catalyst is conveniently introduced into the reaction vessel as a suspension in the diluent. A continuous polymerization technique is disclosed for example by U.S. Pat. No. 3,458,470.

The polyoxymethylene suspension thus obtained, is filtered and the polymer is separated in the form of granules of from 50 to 700 microns and that according to the granulometry of the catalyst used. The polyoxymethylene, after drying, is in the form of a powder having the apparent density values hereinbefore specified.

The polyoxymethylene thus obtained contains at least one terminal hydroxyl group for each macronolecule which renders the product thermically unstable. For the purpose of avoiding a depolymerization from the chain extremity, the hydroxyl groups are substituted by ester- of ether groups, such as for example, by treatment with acetic anhydride or, respectively, with methyl- or ethyl orthoformate, or by urethan groups by treatment with an isocyanate. These treatments can be carried out by processes known in the art.

The thus treated polyoxymethylene is admixed with an antioxidant (substituted phenol or bisphenol) as well as with other substances of a basic nature, capable of blocking the formaldehyde or its oxidation products such as formic acid. These basic substances may be of a polymeric character, such as, for instance, polyamides or polyesteramides.

In the following experimental Examples, the parts and percentages are intended by weight unless otherwise specified.

EXAMPLE 1

0.68 parts of metallic sodium are added to 113 parts of pure ε-caprolactam at a temperature of 110° C, maintained under stirring in an atmosphere rigorously inert.

100 parts of pure and anhydrous dimethyl sulfoxide and 4.65 parts of acetylacprolactam are added at the end of the reaction of formation of the metal-lactam. The reaction temperature is brought to 155°–160° C for a period of 6 hours. The solution which gradually became more viscous, is cooled while in the same time 400 parts of benzene are added. The polymer A precipitates in the form of a fine powder. The suspension is thouroughly washed with perfectly anhydrous benzene, in such a way as to eliminate completely the reaction solvent and the other soluble substances present. On the polymer A thus formed, the following determinations are performed:

| Conversion percentage of the monomers | : | 83.8 |
|---|---|---|
| Reduced viscosity (liters.g$^{-1}$) | : | 0.78 |

(In the Example, the A polymer viscosity is always measured at 35° C from a m-cresol solution containing 0.5 wt % polymer and expressed as the ratio $\eta$ reduced =$\eta$ specific/concentration in liters .g$^{-1}$).

| >125 | microns : | 0.6% |
|---|---|---|
| 125–88 | microns : | 38.3% |
| 88–40 | microns : | 44.8% |
| <44 | microns : | 16.3% |

The benzene suspension of the polymer A is now ready for the subsequent stage of formaldehyde polymerization.

Gaseous pure monomer formaldehyde is introduced, at the rate of 2.5 parts per minute, into a polymerization reactor containing 1000 parts of anhydrous benzene and 0.56 parts of the polymer A previously prepared. The reactor is supplied with a vigorous stirrer and a system to ensure strictly anhydrous conditions by means of a nitrogen flow, and is supplied also with a thermostating jacket. More 0.196 parts of anhydrous ethanol are introduced into the reactor.

The monomer feeding is continued for 224 minutes, while maintaining the reaction temperature at 25°–30° C.

Finally the nitrogen flow is switched and the polyoxymethylene slurry thus formed is maintained for 10 minutes longer under stirring, then is filtered.

The residual solid is dried in a vacuum oven at 60° C, thus recovering 529.2 parts of polyoxymethylene, with a yield equal to 94.5% with respect to the monomer introduced.

The polyoxymethylene has an intrinsic viscosity equal to 1.78 liters .g$^{-1}$.

In the Example, the polyoxymethylene viscosity is always measured at 60° C from a solution of p-chlorophenol with 2 wt. % α pinene containing 0.5 wt. % polyoxymethylene, and expressed as the ratio $\eta$ intrinsic = relative/concentration in liters.g$^{-1}$.

One part of the polyoxymethylene is esterified by a reactive system consisting of 1.3 parts of pure acetic anhydride and 3.0 parts of a mixture of $C_{12}$–$C_{13}$ n-paraffins (in a 30:70 ratio) at a temperature of 153°–155° C for a period of 15 minutes. The system is maintained at boiling point, by proper control of the pressure. After cooling, the suspension is filtered and the acetylated polyoxymethylene is thoroughly washed with toluene and then dried in a vacuum oven at 60° C.

96.8% of an polyoxymethlene charged is recovered in this way.

The acetylated polyoxymethylene is submitted to the following measurements:

| Intrinsic viscosity | : | 1.79 |
|---|---|---|
| Apparent density | : | 0.71 g/ml |
| $K_{220}$ | : | 0.08 |

$K_{220}$ is the decomposition rate at 220° C in a nitrogen atmosphere during the 30 first minutes, expressed in percent by weight of polymer and measured by a thermoscale. The degradation products are continuously discharged by flushing with a nitrogen flow.

The polymer is fractionated in a steel column filled with Celite (R.T.M.), using dimethylformamide as a solvent, carrying out the operation at a programmed temperature. The analysis of the individual fractions shows that the polymer has a polydisperivity ratio $\bar{M}w/\bar{M}n$ equal to 1.79.

—Other physical-mechanical properties are determined after addition of 0.25% of a polyesteramide block polymer consisting of 93% of ε-caprolactam and 7% of caprolactone and of 0.4% of n-octadecyl-beta(4-hydroxy-3,5-di-tert-butylphenyl)propionate and melting of the resulting blend. The results (POM-1) are summarized in Table 1.

EXAMPLE 2

By carrying out the operation in a way analogous to that of Example 1, a flow of gaseous pure monomer formaldehyde is introduced at the rate of 2.5 parts per minute for a period of 152 minutes into the polymerization reactor containing 1000 parts of cyclohexane and 0.30 parts of the polymer A as prepared in the first part of Example 1. Also, 0.19 parts of ethyl alcohol are charged in the reactor.

The reaction temperature is maintained at 0° C by circulation of brine in the jacket. At the end of the operation the monomer flow is switched and the polyoxymethylene slurry is maintained for 10 minutes longer under stirring and then is filtered. The residual solid is dried in a vacuum oven at 60° C thus recovering 356.4 parts of polyoxymethylene in a yield equal to 93.8% with respect to the feed in formaldehyde.

On the polymer the following tests have been performed:

| Intrinsic viscosity | : | 1.34 | |
|---|---|---|---|
| Apparent density | : | 0.63 g/ml | |
| Granulometry: | | | |
| >500 | microns = | | 0.2% |
| 500–250 | microns = | | 9.8% |

-continued

| | | |
|---|---|---|
| 250–125 | microns = | 55.6% |
| 125–88 | microns = | 32.4% |
| <88 | microns = | 2.0% |

One part of polyoxymethylene is stabilized by esterification with acetic anhydride with a reactive system identical to that of Example 1 and with a yield of reaction equal to 95.0%.

The acetylated polyoxymethylene has an intrinsic viscosity identical to that of the non-acetylated polyoxymethylene.

The following tests are performed on the acetylated polyoxymethylene according to the precedure of Example 1:
— $K_{220} = 0.05$;
— $\overline{M}w/\overline{M}n = 1.84$;
— Other physical-mechanical properties have been determined after addition stabilizers and melting in a way analogous to that indicated in Example 1.

The results (POM-2) are summarized in Table 1.

Table 1

| | POM-1 | POM-2 |
|---|---|---|
| Tensile strength in Kg/sq.cm (ASTM D-638) | 715 | 710 |
| Elongation in % (ASTM D-638) | 74 | 28 |
| Impact strength Izod with notch in Kg.cm/sq.cm (ASTM-D 256) | 15 | 9.0 |

EXAMPLE 3

0.14 parts of metallic sodium are added to 113 parts of pure ε-caprolactam at the temperature of 110° C, maintained under stirring in an inert atmosphere. After 10 minutes the formation reactions of the metal-lactam is practically completed. Then 150 parts of pure and anhydrous toluene and 2.1 parts of acetyl-caprolactam are added. The reaction system is heated under these conditions for 4 hours. The polymer A suspension obtained is finally cooled and thoroughly washed with toluene in order to eliminate any soluble residue.

The analysis of a sample of polymer A shows the following results:

| Conversion | : | 88.8% | |
|---|---|---|---|
| Reduced viscosity | : | 1.18 | |
| Granulometry | : | | |
| >125 | microns = | | 3.6% |
| 125–88 | microns = | | 28.9% |
| 88–44 | microns = | | 48.6% |
| <44 | microns = | | 8.9% |

A long lasting test for polymerization of the formaldehyde is performed using the reactor of Example 1, modified so as to feed it with cyclohexane and polymer A and continuously discharge the suspension of polyoxymethylene formed. Initially a flow of pure gaseous monomer formaldehyde is introduced at a rate of 2.5 parts per minute for a period of 305 minutes into the reactor containing 1000 parts of cyclohexane and 1.9 parts of polymer A. Subsequently the slurry is withdrawn continuously, while solvent is introduced in order to maintain a constant level in the reactor.

During the 200 hours operation, 45 parts of polymer A and 16.9 parts of isopropyl alcohol are introduced.

During the operation 144.0 parts of polyoxymethylene havng an intrinsic viscosity of 1.72–1.75 are produced every hour. The apparent density of the powder is of 0.75 g/ml.

At the end of the operation the formaldehyde flow is switched. After 10 minutes of subsequent stay, the remaining slurry is discharged.

At the end of the operation, the polymerization system, that is both the static part (walls, pipe for conveying the suspension, thermometric sheath etc.) and the moving part (such as the stirrer) remain perfectly clean. The slight deposit of polymer is particular zones such as the solution edge level, is easily friable because it is not incrusted.

One part of polyoxymethylene is stabilized by esterification with acetic anhydride in a reactive system identical to that of Example 1, carrying out the operation under the same conditions. In this manner, 96.3% of acetylated polyoxymethylene is recovered, with respect to the polyoxymethylene charged. On the acetylated polyoxymethylene the following determinations are run:

| Intrinsic viscosity | : | 1.75 | |
|---|---|---|---|
| Apparent density | : | 0.75 g/ml | |
| Granulometry | : | | |
| >350 | microns = | | 6.2% |
| 350–250 | microns = | | 46.4% |
| 250–125 | microns = | | 40.1% |
| <125 | microns = | | 7.3% |
| $K_{220} = 0.09$ | | | |

— The polymer is fractionated as described in Example 1 and a polydispersivity ratio of 1.83 is found.

EXAMPLE 4

0.80 parts of metallic potassium are added under extremely inert conditions and under stirring at 60° C to 85 parts of pure α-pyrrolidone. The formation reaction of the metal-lactam is rapid and at the end 85 parts of dimethyl sulfoxide and 1.27 parts of N-acetyl pyrrolidone are added while the reaction temperature is brought to 0° C.

The reaction system is maintained under these conditions under stirring for 50 hours. At the end of the operation the suspension formed is diluted and then thoroughly washed with anhydrous toluene in order to eliminate the soluble residues of the polymerization. The analysis of the polymer A shows the following results:

| Conversion | : | 84.5% | |
|---|---|---|---|
| Reduced viscosity | : | 1.37 | |
| Granulometry | : | | |
| >125 | microns = | | 3.4% |
| 125–88 | microns = | | 53.4% |
| 88–44 | microns = | | 37.1% |
| <44 | microns = | | 6.1% |

By operating in the way described in Example 1, a pure gaseous monomer formaldehyde flow is introduced at a rate of 2.5 parts per minute for a period of 128 minutes into the polymerization reactor containing 1000 parts of n-heptane and 0.8 parts of polymer A, prepared as previously described. Also, 0.2 parts of acetic acid are introduced into the reactor.

The polymerization temperature is maintained at about 0° C by means of circulation of brine in the jacket. At the end of the operation the formaldehyde gaseous flow is switched and the polyoxymethylene slurry is maintained 10 minutes longer under stirring and then is filtered.

The solid remained on the filter is dried in a vacuum oven at 60° C, recovering in this manner 307.8 parts of polyoxymethylene with a yield equal to 96.0% with respect to the feed in formaldehyde.

The polyoxymethylene has an intrinsic viscosity equal to 1.22 and an apparent density equal to 0.69 g/ml.

One part of polyoxymethylene is stabilized by esterification with acetic anhydride in a reaction system identical to that of Example 1.

At the end of the operation 95.1% of acetylated polyoxymethylene, which has an intrinsic viscosity equal to that on the initial product, is recovered.

On the acetylated polyoxymethylene the following test are run:
—Thermal degradation test — $K_{220} = 0.06$;
—The fractional performed as described in Example 1 shows a polydispersivity value equal to 1.88.
—The polymer is submitted to a physical molecular characterization both by means of differential calorimetry and of optical microscopy. The velocity of crystallization under isothermal conditions is determined by means of the Differential Scanning Calorimeter, while the radial growth velocity of the crystals, the nucleation density and the spherulities dimensions are measured by means of the optical microscope. The results (POM-4) are summarized in Table 2.

EXAMPLE 5

By operating in a manner analogous to that of Example 1, a pure gaseous monomer formaldehyde flow is introduced at the rate of 2.5 parts per minute for a period of 180 minutes into the reactor containing 1000 parts of benzene and 0.54 parts of the polymer A prepared in the first part of Example 1. Also, 0.2 parts of acetic acid, are introduced into the reactor.

The polymerization temperature is maintained at about 40° C by means of water circulation in the jacket. At the end of the operation the suspension is filtered and the solid residue is dried at 60° C under vacuum, recovering in that manner, 423.5 parts of polyoxymethylene with a yield equal to 94.0% with respect to the feed in formaldehyde.

The following determinations are effected on the polyoxymethylene:

| Intrinsic viscosity | : | 1.53 |
|---|---|---|
| Apparent density | : | 0.67 g/ml |
| Granulometry | : | |
| >350 microns = | | 5.6% |
| 350–250 microns = | | 39.3% |
| 250–125 microns = | | 48.2% |
| <125 microns = | | 6.9% |

EXAMPLE 6

1.2 parts of metallic potassium are added at 180° C to 197 parts of ω-lauryllactam under stirring and in an inert atmosphere, and after 20 minutes 7.17 parts of N-acetyl lauryllactam are added. The mixture is brought to the temperature of 200° C and kept under these conditions for 60 minutes. Subsequently 80 parts of preheated dimethyl sulfoxide are added to the molten polymer A cooled at 190° C. In this way the polymer A is obtained in a very dispersed form by cooling of the resulting solution. The suspension is thoroughly washed with benzene by decantation in order to eliminate any soluble residue.

The analysis of the polimer A shows the following results:

| Conversion | | : | 90.1 % |
|---|---|---|---|
| Reduced viscosity | | : | 1.20 |
| Granulometry | | : | |
| >88 | microns = | | 1.2% |
| 88–44 | microns = | | 37.7% |
| <44 | microns = | | 61.1% |

Carrying out the operation on a manner analogous to that of Example 1, a flow of pure gaseous monomer formaldehyde is introduced at a rate of 2.5 parts per minute for a period of 160 minutes into the polymerization reactor containing 1000 parts of toluene and 0.88 parts of polymer A prepared as indicated above. Also, 0.44 parts of benzoic acid are introduced.

The polymerization temperature is maintained at about 35° C by means of water circulation in the reactor jacket.

At the end of the operation the monomer gaseous flow is switched and the polyoxymethylene slurry formed is maintained for 10 minutes longer under stirring and then is filtered.

The residual solid is dried in a vacuum oven at 60° C and 378.8 parts of polyoxymethylene are recovered in this way, with a yield of 94.5% with respect to the feed in formaldehyde.

The polymer has an intrinsic viscosity equal to 1.20, an apparent density equal to 0.70 g/ml and the following granulometric distribution:

| >250 | microns = | 15.4 % |
|---|---|---|
| 250–125 | microns = | 35.3 % |
| 125–88 | microns = | 36.4 % |
| <88 | microns = | 19.9 % |

The polyoxymethylene is acetylated in a way analogous to that indicated in Example 1, thus recovering 95.4% of acetylated polyoxymethylene. The following tests are run on the acetylated polyoxymethylene:

| Intrinsic viscosity | : | 1.21 |
|---|---|---|
| Apparent density | : | 0.70 g/ml |
| Thermal degradation test | : | $K_{220} = 0.06$ |

—In a way analogous to that described in Example 4 the polyoxymethylene is submitted to calorimetric and optical determinations to examine the behavior during crystallization:

The results (POM-6) are reported in Table 2

Table 2

| | POM-4 | POM-6 |
|---|---|---|
| $t_{0.5}$ (157° C) | 250 | 400 |
| r microns (157° C) | 30 | 50 |
| N (157° C) | 10 | 1 |

$t_{0.5}$ semicrystallization time: time necessary for the crystallization of 50% of the crystallizable material at constant temperature (in seconds);
r  average radius of the spherulites after 2 minutes of crystallization time of the polymer at 157° C;
N  number of nuclei per unit of volume under isothermal crystallization conditions at 157° C.

EXAMPLE 7

By operating in a manner analogous to that of Example 1, of pure gaseous monomer formaldehyde is introduced at a rate of 2.5 parts per minute for a period of 228 minutes into the polymerization reactor containing 1000 parts of benzene and 0.19 parts of the polymer A prepared in the first part of Example 6. Also, 0.17 parts of butyl alcohol are introduced into the reactor.

The polymerization temperature is maintained at 10°–15° C.

At the end of the operation the suspension is filtered and the polyoxymethylene is dried at 60° C under vacuum, thus recovering 521.5 parts of polyoxymethylene with a yield of 91.5% with respect to the feed in formaldehyde.

The polyoxymethylene has an intrinsic viscosity equal to 1.60 and an apparent density equal to 0.73 g/ml.

One part of polyoxymethylene is stabilized by etherification in a reactive system consisting of 0.4 parts of triethylorthoformate, 0.8 parts of anhydrous dimethylacetamide, 2 parts of n-dodecane, and 0.05 parts of ethyl sulfate. The reaction mixture is maintained at a temperature of 150°–152° C for a period of 15 minutes.

Finally the suspension is cooled and the etherified polyoxymethylene is filtered, washed with toluene containing 1% of triethanolamine and subsequently with methanol.

After drying, 99.1% of etherified polyoxymethylene is recovered.

The etherified polyoxymethylene, which does not show appreciable variations of intrinsic viscosity and of apparent density, is submitted to the following tests:
—Thermal degradation test = $K_{200}$ = 0.06;
—Stability to alkaline attack (FAS).

The sample is brought into solution in benzyl alcohol containing 1% of triethanolamine at the temperature of 150°–152° C for a period of 30 minutes. The etherified polyoxymethylene/benzyl alcohol ratio is maintained equal to 1:10. At the end of the operation the etherified polyoxymethylene is precipitated by cooling and after filtration is washed with methanol and dried.

The residual percentage is indicated as the alkali-stable fraction (FAS).

—Other physical-mechanical characteristics are determined on the etherified polyoxymethylene after addition of 0.3% of 2,2'-methylene-bis-(4-methyl-6-tert-butylphenol) and 0.3% of polyvinylpyrrolidone having a molecular weight of 30,000 and subsequent melting of the resulting mixture.

The data (POM-7) are reported in Table 3.

—The etherified polyoxymethylene is submitted to fractionating in a way analogous to that indicated in Example 1 and the polydispersivity ratio is equal to 1.72.

EXAMPLE 8

0.60 parts of metallic potassium are added at 90° C under stirring and under strictly inert conditions to 113 parts of ε-caprolactam. Then 100 parts of pure anhydrous dimethylacetamide, 40 parts of α-pyrrolidone and 4.6 parts of N,N-diphenyl-carbamoyl-caprolactam are added. The mixture is maintained in reaction at the temperature of 165° C for 4 hours, and then cooled while adding cumene so as to precipitate polymer A in the form of a fine powder. The reaction solvent is removed by thoroughly washing with cumene. Analysis of the polymer A shows the following results:

| Conversion | - 74.5% |
| --- | --- |
| Reduced viscosity | - 0.84 |
| α-pyrrolidone | - 10.7% |
| Melting point | - 207–209° C |
| Granulometry: | |
| >125 microns = | 3.7% |
| 125–88 microns = | 40.3% |
| <88 microns = | 45.0% |

By operating in a way analogous to that of Example 1, a flow of pure, gaseous monomer formaldehyde is introduced at a rate of 2.5 parts per minute and for a period of 340 minutes into a polymerization reactor containing 1000 parts of benzene and 2.12 parts of the polymer A prepared as indicated hereinbefore. Also, 0.56 parts of ethyl alcohol are introduced into the reactor. The polymerization temperature is maintained at 35°–37°30' C.

At the end of the operation, 816 parts of polyoxymethylene are recovered with a 95.8% yield with respect to the formaldehyde.

One part of polyoxymethylene is stabilized by etherification with the reactive system indicated in Example 7. The yield in etherified polyoxymethylene is equal to 98.9%.

The following determinations are performed on the etherified polyoxymethylene:
—Intrinsic viscosity : 1.17
—Apparent density : 0.78 g/ml
—Thermal degradation test : $K_{220}$ = 0.05
—Stability test to alkaline attack FAS, (as described in Example 7).
—Other physical-mechanical characteristics are determined after addition of stabilizers in a way identical to that indicated in Example 7.

The results (POM-8) are reported in Table 3.

The polymer is submitted to fractionating in a way analogous to that indicated in Example 1. A polydispersivity ratio equal to 1.81 is obtained.

Table 3

| | POM-7 | POM-8 |
| --- | --- | --- |
| Melt index at 195° C (g/10 minutes) | 5.5 | 21.0 |
| Tensile strength (Kg/sq.cm) | 710 | 700 |
| Elongation (%) | 50 | 22 |
| Impact strength Izod with notch (Kg.cm/sq.cm) | 10 | 8 |
| FAS (%) | 97.2 | 98.4 |

We claim:

1. A method for the preparation of polyoxymethylene, which comprises feeding anhydrous monomeric formaldehyde into a reaction medium comprising an organic diluent which is liquid under the reaction conditions, non solvent for the polyoxymethylene and inert (non-reactive) towards the other constituents of the reaction medium, and comprising a catalyst dispersed in said liquid reaction medium, consisting of a polymer A carrying a terminal ionic couple on its macromolecular chain, said polymer being a polylactamic block consisting of recurring units:

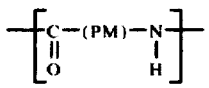

obtainable from one or more lactam monomers of the general formula:

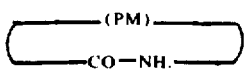

wherein PM is a linear polymethylene chain having from 3 to 13 carbon atoms, non substituted or having at least one hydrogen atom replaced by a radical selected in the group consisting of the alkyl, aryl, alkylaryl and cycloakyl radicals, said polymer A being used in a proportion of from 0.001 to 0.1% by weight with respect to the polyoxymethylene.

2. The method of claim 1, wherein said polymer A has a molecular weight of from 1000 to 50,000.

3. The method of claim 1, wherein said monomeric lactams are selected in the group consisting of ε-caprolactam, α-pyrrolidone, ω-lauryllactam, α-piperidone and ω-enantiolactam.

4. The method of claim 1, wherein said diluent is selected in the group consisting of ethers, hydrocarbons and chlorinate hydrocarbons.

5. The method of claim 1, wherein the reactive temperature is from −70° C up to the boiling temperature of the organic diluent, at any rate not exceeding 110° C.

6. The method of claim 1, wherein the reaction temperature is of from −30° to 70° C.

7. The method of claim 1, wherein said polymer A is obtained by polymerization of one or more of said lactam monomers at a temperature of from -30° to 300° C, for a period of from 1 minute to 120 hours and in the presence of a derivative of a lactam of the formula:

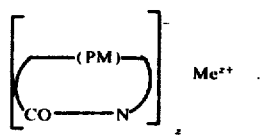

wherein Me is an alkali metal, an alkaline earth metal or a quaternery ammonium group, z is 1 to 2, and PM is the said polymethylene chain, said derivative being used in a proportion of from 0.1 to 10 moles for each 100 moles of lactam monomers.

8. The method of claim 7, wherein said polymer A is obtained by polymerization in the presence of an activator in an amount of from 0.015 to 10 moles for each 100 moles of lactam monomers.

9. The method of claim 1, wherein said dispersed polymer A is in the form of particles of from 1 to 300 microns in size.

* * * * *